(12) United States Patent
Lovato et al.

(10) Patent No.: US 9,585,231 B2
(45) Date of Patent: Feb. 28, 2017

(54) DEVICE FOR TRANSMITTING AN ELECTRICAL PARAMETRIZATION SIGNAL TO A DRIVE MEMBER OF A LIGHT-EMITTING DIODE BASED LIGHTING MODULE, ASSOCIATED POWER SUPPLY SYSTEM, LIGHTING ASSEMBLY AND METHOD OF TRANSMISSION

(71) Applicant: Schneider Electric Industries SAS, Rueil Malmaison (FR)

(72) Inventors: Jean-Louis Lovato, Biviers (FR); Dominique Persegol, Grenoble (FR); Alain Dentella, Beaucroissant (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 14/823,071

(22) Filed: Aug. 11, 2015

(65) Prior Publication Data
US 2016/0073481 A1    Mar. 10, 2016

(30) Foreign Application Priority Data

Sep. 8, 2014    (FR) ...................... 14 58409

(51) Int. Cl.
*H05B 37/02*    (2006.01)
*H05B 33/08*    (2006.01)

(52) U.S. Cl.
CPC ..... *H05B 37/0263* (2013.01); *H05B 33/0812* (2013.01); *H05B 33/0815* (2013.01);
(Continued)

(58) Field of Classification Search
CPC ............ H05B 37/0263; H05B 37/0227; H05B 33/0812; H05B 33/0815; H05B 33/0854
See application file for complete search history.

(56) References Cited

U.S. PATENT DOCUMENTS

| 6,097,761 A | 8/2000 | Buhring et al. |
| 2004/0208632 A1* | 10/2004 | Dietz ................... G09G 3/3406 398/182 |

(Continued)

FOREIGN PATENT DOCUMENTS

| EP | 0 858 174 A2 | 8/1998 |
| EP | 1 244 334 A2 | 9/2002 |
| WO | WO 2014/094016 A2 | 6/2014 |

OTHER PUBLICATIONS

French Preliminary Search Report issued Jul. 16, 2015 in French Application 14 58409, filed on Sep. 8, 2014 ( with English Translation of Categories of Cited Documents).

*Primary Examiner* — Tung X Le
*Assistant Examiner* — Raymond R Chai
(74) *Attorney, Agent, or Firm* — Oblon, McClelland, Maier & Neustadt, L.L.P.

(57) ABSTRACT

A device for transmitting an electrical parametrization signal to a drive member of a lighting module based on light-emitting diodes includes a device for transmitting the parametrization signal, while the drive member includes a device for changing the polarity of the lighting module. The transmission device is intended to be connected to a wired electrical link between the drive member and the lighting module and includes first device for detecting a signal for instructing the switching of the lighting module to reverse polarity. The transmission device are adapted for transmitting the parametrization signal to the drive member, subsequent to the detection of the signal for instructing reverse polarity.

15 Claims, 6 Drawing Sheets

(52) U.S. Cl.
CPC ..... *H05B 33/0854* (2013.01); *H05B 37/0227* (2013.01); *H05B 37/0218* (2013.01); *Y02B 20/346* (2013.01)

(56) References Cited

U.S. PATENT DOCUMENTS

| | | | | |
|---|---|---|---|---|
| 2008/0186301 A1* | 8/2008 | Park | ..................... | G09G 3/3233 345/211 |
| 2012/0194493 A1* | 8/2012 | Soto | ..................... | G09G 3/3406 345/207 |
| 2014/0341589 A1* | 11/2014 | Schmid | ............... | H04B 10/116 398/131 |
| 2015/0123938 A1* | 5/2015 | Gecnuk | ............... | H03K 17/943 345/174 |
| 2016/0073481 A1* | 3/2016 | Lovato | ............... | H05B 33/0812 315/297 |

* cited by examiner

DEVICE FOR TRANSMITTING AN ELECTRICAL PARAMETRIZATION SIGNAL TO A DRIVE MEMBER OF A LIGHT-EMITTING DIODE BASED LIGHTING MODULE, ASSOCIATED POWER SUPPLY SYSTEM, LIGHTING ASSEMBLY AND METHOD OF TRANSMISSION

The present invention relates to a device for transmitting a parameterizing electrical signal to a member for driving a lighting module with light-emitting diodes and a power supply system for one or more lighting modules with light-emitting diodes comprising one or more such transmission devices and one or more such driving members.

The present invention relates also to a lighting assembly with light-emitting diodes comprising one or more such lighting modules and one such power supply system, and a method for transmitting such a parameterizing signal to such a driving member.

The or each lighting module comprises at least one light-emitting diode and is suitable for being biased according to a forward bias or according to a reverse bias, notably according to its direction of connection to the power supply system. The light-emitting diode or diodes are forward biased for the forward bias of the lighting module, and respectively reverse biased for the reverse bias of the lighting module.

In the field of powering lighting modules with light-emitting diodes, it is known practice to use power supply systems which make it possible to combine, in one and the same casing, a plurality of electrical power supply links for a plurality of lighting modules. The power supply for the lighting modules is thus centralized. Furthermore, such systems comprise members driving the lighting modules, suitable for driving the lighting modules and the power which is delivered to them as a function of quantities, such as brightness, relating to an environment in which the lighting modules are located and measured by sensors.

However, in the known systems, the sensors are incorporated in the lighting modules and the power supply systems have a particular architecture dependent on the lighting modules to which they are intended to be connected. Thus, such power supply systems are complex, comprise inputs designed to be connected only to certain sensors and are difficult to implement.

Furthermore, the document US 2012/0187845 A1 discloses a power supply system for a plurality of lighting modules with light-emitting diodes comprising a processing unit, suitable for receiving data concerning the environment in which the lighting modules are located and for transmitting these data to a driving member via a specific electrical link. The driving member is then suitable for controlling the electrical power delivered to the lighting modules as a function of these data.

However, such a system is inefficient from an energy point of view, and establishing the connections between the driving member, the processing unit and the lighting modules is complex in such a system. Furthermore, the transmission of said data to the driving member remains complex to implement.

The aim of the invention is therefore to propose a device for transmitting a parameterizing electrical signal to a member for driving a lighting module with light-emitting diodes that makes it possible to simplify the transmission of the parameterizing signal to the driving member, and the architecture of the electrical links between the driving member and the transmission device.

To this end, the subject of the invention is a device for transmitting a parameterizing electrical signal to a member for driving a lighting module with light-emitting diodes, the device comprising means for transmitting the parameterizing signal to the driving member, the lighting module comprising at least one light-emitting diode and being suitable for being biased according to a forward bias or according to a reverse bias, the light-emitting diode or diodes being forward biased for the forward bias of the lighting module, and respectively reverse biased for the reverse bias of the lighting module, the driving member comprising means for changing the bias of the lighting module. In accordance with the invention, the transmission device is intended to be connected to a wired electrical link between the driving member and the lighting module, the transmission device comprises first means for detecting a signal commanding the lighting module to switch to reverse bias, the reverse bias command signal being generated by the changing means, and the transmission means are adapted to transmit the parameterizing signal to the driving member, following the detection of the reverse bias command signal.

By virtue of the invention, the transmission of the parameterizing signal to the driving member is simplified and improved, since the parameterizing signal is transmitted when the bias changing means command the lighting module to switch to reverse bias. Furthermore, the architecture of the electrical links between the driving member and the transmission device is also simplified, since the transmission device is intended to be connected to a wired electrical link, advantageously consisting of a single wire pair, between the driving member and the lighting module.

According to other advantageous aspects of the invention, the transmission device comprises one or more of the following features, taken in isolation or in all technically possible combinations:

the first detection means comprise a first member for measuring the intensity of the current on the electrical link, the first detection means being suitable for detecting the reverse bias command signal when the intensity of the measured current is zero.

The first detection means comprise a first switch suitable for switching between an open position, in which the transmission means and the electrical link are electrically isolated from one another, and a closed position, in which the transmission means and the electrical link are electrically linked to one another, and in which the first switch being configured to switch to its closed position following the detection of the reverse bias command signal.

The device comprises second means for detecting a signal commanding the lighting module to switch to forward bias, the forward bias command signal being generated by the changing means, and the first switch is configured to switch to its open position following the detection of the forward bias command signal.

The transmission device comprises an energy storage member and a second switch suitable for switching between a closed position, in which the energy storage member is electrically linked to the electrical link and stores at least a part of the electrical energy transmitted over the electrical link and an open position, in which the energy storage member is electrically isolated from the electrical link, the second switch being configured to switch to its open position following the detection of the reverse bias command signal and to its closed position following the detection of the forward bias command signal.

The transmission device comprises means for recovering parameters associated with the lighting module and/or with an environment in which the lighting module is installed and means for modifying the amplitude and/or the form of the parameterizing signal transmitted over the electrical link as a function of the parameter or parameters recovered by the recovery means.

The transmission means are suitable for transmitting a current over the electrical link when the first switch is in closed position, the current transmitted corresponding to the parameterizing signal.

Another subject of the invention is a power supply system for one or more lighting modules with light-emitting diodes, each lighting module comprising at least one light-emitting diode and being suitable for being biased according to a forward bias or according to a reverse bias, the light-emitting diode or diodes being forward biased for the forward bias of the lighting module and respectively reverse biased for the reverse bias of the lighting module, the system comprising:

at least one member for driving the lighting module or modules, the driving member comprising means for changing the bias of the lighting module or modules, an electrical power supply member for the lighting module or modules, the power supply member being electrically linked to each driving member, and at least one device for transmitting a parameterizing electrical signal to the driving member or members.

In accordance with the invention, each transmission device is as defined above.

According to other advantageous aspects of the invention, the power supply system further comprises one or more of the following features, taken in isolation or in all technically possible combinations:

each transmission device is defined above, the or each driving member being linked to a corresponding lighting module via a wired electrical link, the electrical link being adapted to transmit, at a time, the reverse bias command signal, the forward bias command signal and the parameterizing signal and comprising only a first conductor and a second conductor.

Each driving member is adapted to drive an electrical power delivered to the corresponding lighting module via the electrical link, as a function of the amplitude and/or of the form of the parameterizing signal which is transmitted to it.

For each transmission device, the first switch is in the form of a diode of bias opposite to that of a corresponding lighting module.

The bias changing means are adapted to command the lighting module or modules to reverse bias for a predetermined maximum duration of a value less than 100 ms, preferably less than 10 ms.

A subject of the invention is a lighting module with light-emitting diodes comprising at least one light-emitting diode and a protection casing inside which are arranged the light-emitting diode or diodes, the lighting module being suitable for being biased according to a forward bias or according to a reverse bias and the light-emitting diode or diodes being forward biased for the forward bias of the lighting module and respectively reverse biased for the reverse bias of the lighting module. According to the invention, the lighting module comprises a device for transmitting a parameterizing electrical signal to a member for driving the lighting module, the driving member comprising means for changing the bias of the lighting module or modules, and the transmission device is arranged inside the protection casing and is as defined above.

Also a subject of the invention is a lighting assembly with light-emitting diodes comprising:

one or more lighting modules with light-emitting diodes, each lighting module comprising at least one light-emitting diode and being suitable for being biased according to a forward bias or according to a reverse bias and the light-emitting diode or diodes being forward biased for the forward bias of the lighting module and respectively reverse biased for the reverse bias of the lighting module, at least one member for driving the lighting module or modules, the driving member comprising means for changing the bias of the lighting module or modules, an electrical power supply member for the lighting module or modules, the power supply member being electrically linked to each driving member, and at least one device for transmitting a parameterizing electrical signal to the driving member or members.

According to the invention, each transmission device is as defined above.

Also a subject of the invention is a method for transmitting a parameterizing electrical signal to a member for driving a lighting module with light-emitting diodes, the lighting module comprising at least one light-emitting diode and being suitable for being biased according to a forward bias or according to a reverse bias, the light-emitting diode or diodes being forward biased for the forward bias of the lighting module, and respectively reverse biased for the reverse bias of the lighting module, the driving member comprising means for changing the bias of the lighting module, the method comprising the following step:

the transmission of the parameterizing signal to the driving member.

According to the invention, prior to the transmission step, the method comprises the following steps:

the generation of a signal commanding the lighting module to switch to reverse bias, the detection of the reverse bias command signal, and the transmission step is performed following the step of detection of the reverse bias command signal.

The invention will be better understood, and other advantages thereof will become apparent, in light of the following description, given purely as a nonlimiting example, and with reference to the drawings in which.

Figure 1:
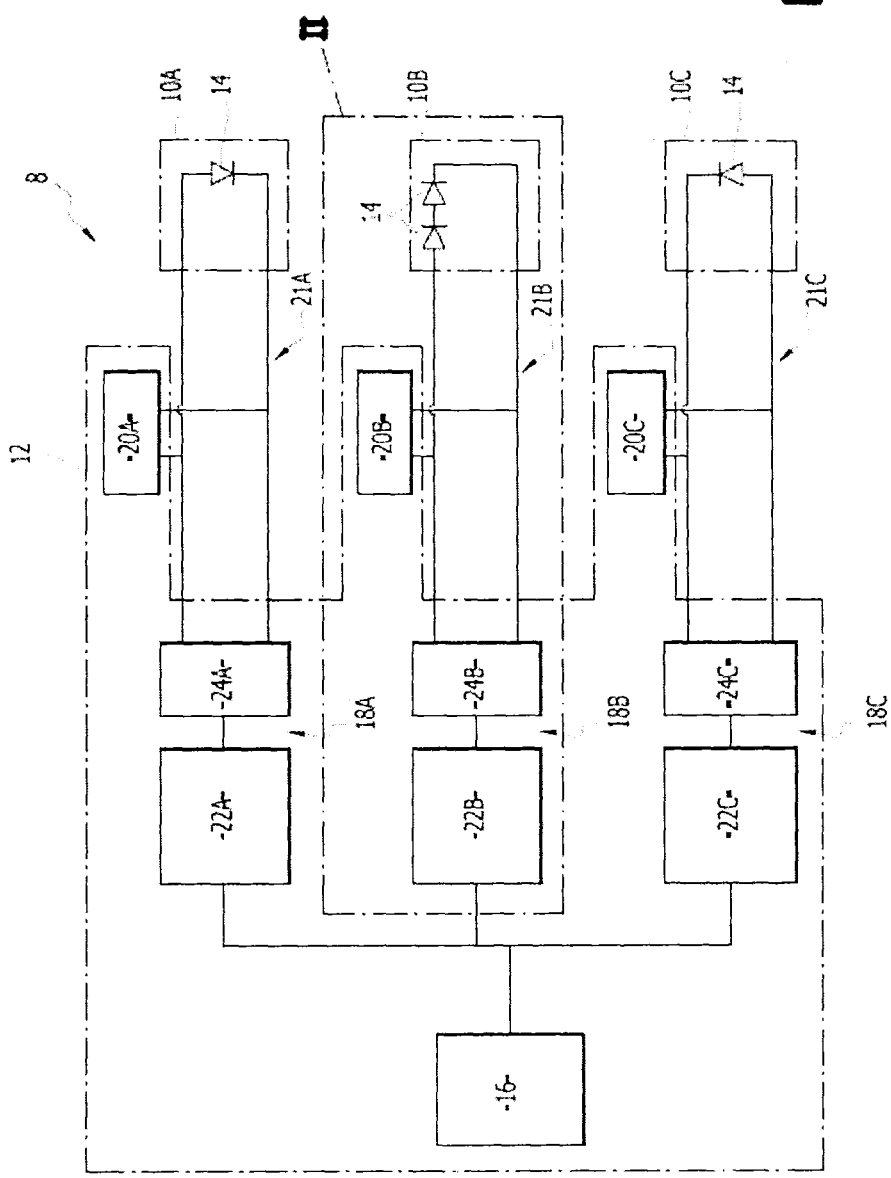
FIG. 1 is a schematic representation of a lighting assembly with light-emitting diodes according to a first embodiment of the invention, the assembly comprising a first, a second and a third lighting modules with light-emitting diodes, and a power supply system for the lighting modules.

A lighting assembly 8 with light-emitting diodes, presented in FIG. 1, comprises a first 10A, a second 10B and a third 10C lighting modules with light-emitting diodes, and a power supply system 12 for the lighting modules 10A, 10B and 10C.

The lighting modules 10A, 10B, 10C each comprise one or more light-emitting diodes 14 suitable for being biased according to a forward bias or according to a reverse bias. Each lighting module 10A, 10B, 10C is in a forward bias when the light-emitting diode or diodes 14 which are associated with it are forward biased, respectively in a reverse bias when the light-emitting diode or diodes 14 which are associated with it are reverse biased.

The power supply system 12 comprises an electrical power source 16 electrically linked to respective members 18A, 18B, 18C for driving the lighting modules 10A, 10B, 10C.

The power supply system 12 also comprises, for each lighting module 10A, 10B, 10C, a device 20A, 20B, 20C for transmitting a parameterizing electrical signal S1 to the associated driving member 18A, 18B, 18C.

The electrical power source 16 is suitable for powering each driving member 18A, 18B, 18C. The power source 16 is for example a voltage source. As a variant, the power source 16 is a current source.

Figure 2:
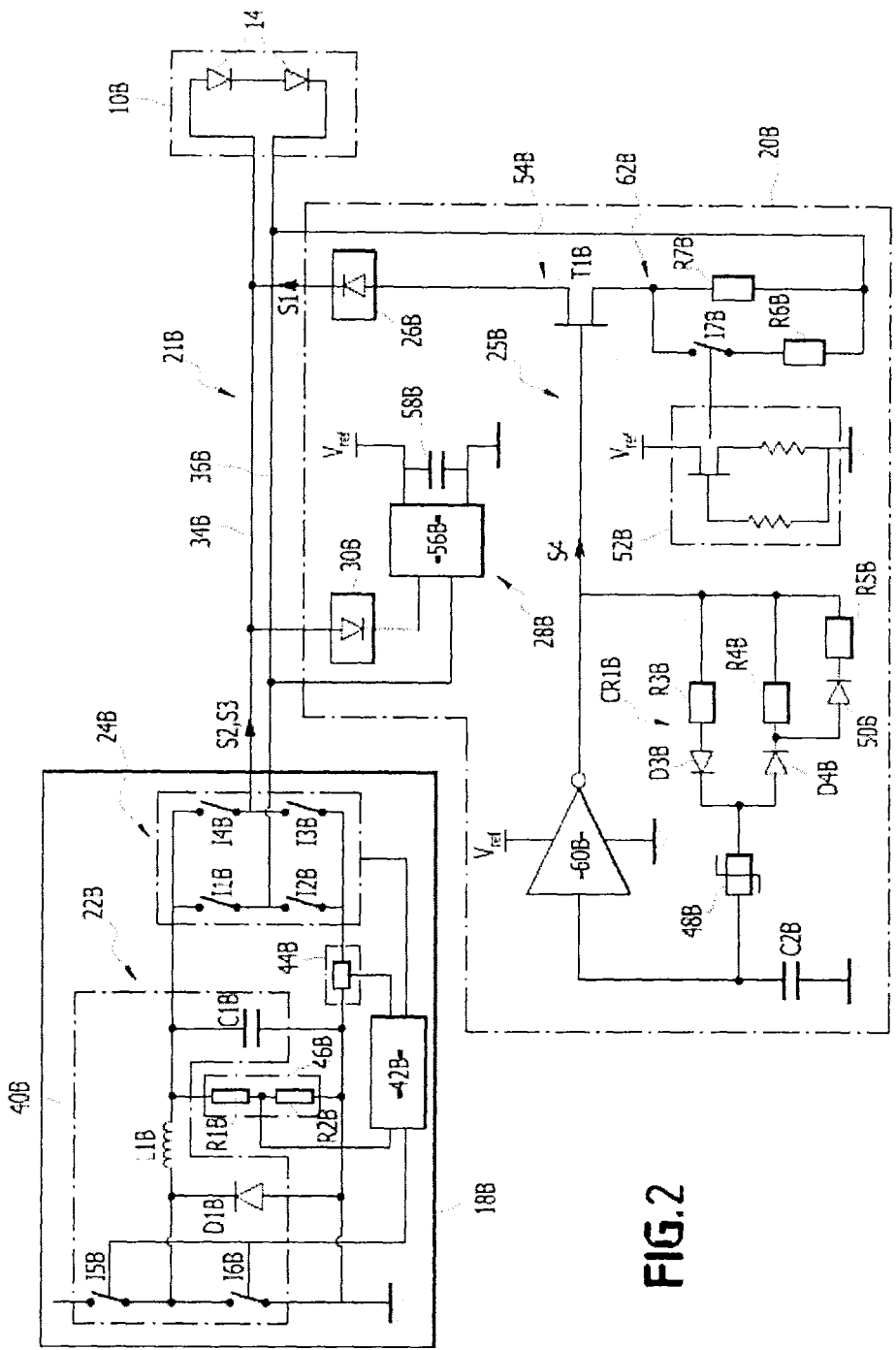
FIG. 2 is a schematic representation of the outlined area II of FIG. 1.

As presented in FIGS. 1 and 2, each driving member 18A, 18B, 18C comprises an electronic processing unit 22A, 22B, 22C and means 24A, 24B, 24C for changing the bias of the lighting module 10A, 10B, 10C associated with said driving member. Each driving member 18A, 18B, 18C is suitable for being linked to the corresponding lighting module 10A, 10B, 10C via a respective wired electrical link 21A, 21B, 21C.

Each transmission device 20A, 20B, 20C is designed to be linked to the associated driving member 18A, 18B, 18C via the corresponding electrical link 21A, 21B, 21C. More specifically, each transmission device 20A, 20B, 20C is connected to the corresponding electrical link 21A, 21B, 21C in parallel to the corresponding lighting module 10A, 10B, 10C.

In FIG. 2, only the driving member 18B and the transmission device 20B associated with the second lighting module 10B are represented. Hereinafter in the description, the aim will be to describe the driving member 18B, the transmission device 20B and the electrical link 21B associated with the second lighting module 10B, bearing in mind that this description applies equally to the other driving members 18A, 18C, transmission devices 20A, 20C and electrical links 21A, 21C which are respectively associated with the first 10A and third 10C lighting modules.

The transmission device 20B comprises, as presented in FIG. 2, means 25B for transmitting the parameterizing signal S1 to the driving member 18B, and a first switch 26B suitable for switching, that is to say varying, between an open position in which the transmission means 25B and the electrical link 21B are electrically isolated from one another, and a closed position in which the transmission means 25B and the electrical link 21B are electrically linked.

The transmission device 20B further comprises an electrical energy storage member 28B and a second switch 30B suitable for switching between a closed position, in which the energy storage member is electrically linked to the electrical link 21B and stores at least a part of the electrical energy transmitted over the electrical link 21B, and an open position in which the energy storage member 28B is electrically isolated from the electrical link 21B.

In this particular embodiment, the switches 26B and 30B are represented by diodes designed to switch automatically as a function of the voltage or current bias, that is to say as a function of the voltage which is applied to them or of the current passing through them.

The electrical link 21B comprises a first conductor 34B and a second conductor 36B designed to electrically power the lighting module 10B. The electrical link 21B preferably consists of the first 34B and second 36B electrical conductors. It then comprises only two electrical conductors 34B, 36B.

The processing unit 22B comprises an electronic block 40B for driving an electrical power delivered over the electrical link 21B, and a control block 42B for the driving block 40B. The processing unit 22B also comprises a member 44B for measuring the intensity of a current circulating on the electrical link 21B and a member 46B for measuring the voltage of the electrical link 21B, associated with the control block 42B.

The bias changing means 24B are designed to be controlled by the control block 42B and to modify the bias of the lighting module 10B. More specifically, the changing means 24B are suitable for generating, on the one hand, a signal S2 commanding the lighting module 10B to switch to reverse bias and, on the other hand, a signal S3 commanding the lighting module 10B to switch to forward bias.

The changing means 24B are designed to command the lighting module 10B to reverse bias, via the reverse bias command signal S2, for a predetermined maximum duration of a value for example less than 100 ms, preferably less than 10 ms. Furthermore, the changing means 24B are suitable for commanding the lighting module 10B to reverse bias with a predetermined periodicity, the period between two commands being, for example, equal to 3 seconds.

The changing means 24B comprise, according to their open or closed position, four controllable switches I1B, I2B, I3B, I4B suitable, according to their open or closed position, for modifying the direction of the current passing through the lighting module 10B. The changing means 24B are, for example, as presented in FIG. 3 and described in paragraph [0025] of the patent application EP2464198 A1.

Consequently, after commanding the lighting module 10B to its reverse bias for the maximum duration, the changing means 24B are suitable for commanding the lighting module 10B to forward bias, via the forward bias command signal S3.

The means 25B for transmitting the parameterizing signal S1 to the driving member 18B comprise a temperature sensor 48B, a brightness sensor 50B and a presence sensor 52B, associated with electrical means 54B for processing data from the temperature 48B, brightness 50B and presence 52B sensors. The transmission means 25B are suitable for transmitting a current over the electrical link when the first switch 26B is in closed position. The current transmitted corresponds to the parameterizing signal S1.

The first switch 26B corresponds to means for detecting the reverse bias command signal S2 and the forward bias command signal S3. The first switch 26B is in the form of a diode of bias opposite to that of the lighting module 10B and which is connected between the first conductor 34B and the electrical processing means 54B. The diode 26B has its cathode connected to the first conductor 34B and its anode connected to the electrical processing means 54B, whereas the diodes 14 of the lighting module 10B are equivalent to a global diode of which the anode is connected to the first conductor 34B and the cathode to the second conductor 36B.

The first switch 26B is configured to switch to its closed position following the detection of the reverse bias command signal S2, that is to say when it detects the reverse bias command signal S2. Similarly, the first switch 26B is configured to switch to its open position following the detection of the forward bias command signal S3.

The storage member 28B is connected between the two conductors 34B, 36B and comprises a charge device 56B associated with an electrical energy storage capacitor 58B. More specifically, the charge device 56B is connected to the two conductors 34B, 36B.

The second switch 30B is connected between the charge device 56B and the first conductor 34B. The second switch 30B is in the form of a diode of the same bias as that of the lighting module 10B and which is connected between the first conductor 34B and the charge device 56B. The second switch 30B corresponds also to means for detecting the reverse bias command signal S2 and the forward bias command signal S3. The diode 30B has its cathode connected to the charge device 56B and its anode connected to the first conductor 34B.

The second switch 30B is configured to switch to its open position, following the detection of the reverse bias command signal S2 and to its closed position following the detection of the forward bias command signal S3.

The first 34B and second 36B conductors, that is to say, the electrical link 21B, are designed to transmit, at a time, the reverse bias command signal S2, the forward bias command signal S3 and the parameterizing signal S1.

The electronic driving block 40B forms a serial chopper, also called buck converter. The electronic driving block 40B is suitable for delivering the electrical power from the power source 16 over the electrical link 21B, the electrical power delivered being controlled by the control block 42B.

The electronic driving block 40B comprises, as presented in FIG. 2, two controllable switches I5B, I6B for controlling the current and the voltage delivered over the electrical link 21B, an overvoltage protection diode D1B, a coil L1B suitable for supplying current to the lighting module 10B and a capacitor C1B.

The control block 42B is suitable for controlling the electrical power delivered over the electrical link 21B, notably via the controllable switches I5B, I6B. The control block 42B is suitable for being linked to the current 44B and voltage 46B measurement members, in order to acquire the measured current and voltage values, and for controlling the driving block 40B and therefore the lighting module 10B as a function of the measured current and voltage values.

The control block 42B is also designed to control the driving block 40B as a function of the parameterizing signal S1, that is to say of the current transmitted by the transmission means 25B and measured by the current measurement member 44B. Thus, the control block 42B, and therefore the driving member 18B, are designed to control and/or drive the electrical power delivered to the lighting module 10B via the electrical link 21B, as a function of the amplitude and/or of the form of the parameterizing signal S1 transmitted.

Advantageously, the control block 42B is able to control the changing means 24B to command the lighting module 10B to forward or reverse bias, and thus control the transmission of the parameterizing signal S1 by commanding the lighting module 10B to reverse bias.

The current measurement member 44B comprises, for example, a shunt. As a variant, the current measurement member 44B comprises a Hall effect current sensor.

The voltage measurement member 46B comprises, for example, two resistors R1B, R2B between which the control block 42B reads a voltage.

The temperature sensor 48B comprises a thermistor of NTC (negative temperature coefficient) type of which the electrical resistance value varies as a function of the temperature.

The brightness sensor 50B comprises a photodiode 50B designed to detect an optical radiation and transform it into a measurement electrical signal, and more specifically into a current.

The presence sensor 52B comprises a sensor of PIR (Passive InfraRed) type. The presence sensor 52B is designed to pick up the infrared radiation emitted notably by a human being and to convert it into a measurement electrical signal suited to the electrical processing means 54B.

The electrical processing means 54B are connected between, on the one hand, the second conductor 36B, and, on the other hand, the first switch 26B which is itself connected to the first conductor 34B. Thus, the electrical processing means 54B are connected between the first 34B and second 36B conductors.

The electrical processing means 54B are designed to transmit the parameterizing signal S1, when the first switch 26B is in its closed position, that is to say when the reverse bias command signal S2 is detected. The electrical processing means 54B are designed to generate the parameterizing signal S1 as a function of data measured by the temperature 48B, brightness 50B and presence 52B sensors. Thus, the electrical processing means 54B are suitable for generating the parameterizing signal S1 in the form of an alternating current of which the frequency varies as a function of the value of the electrical resistance of the temperature sensor.

The duty cycle of the parameterizing signal S1 varies as a function of the measurement signal emitted by the brightness sensor 50B and the amplitude of the parameterizing signal S1 varies as a function of the measurement signal emitted by the presence sensor 52B. The transmission means 25B are therefore designed to generate, then transmit, the parameterizing signal S1 to the driving member 18B, following the detection of the reverse bias command signal.

The electrical processing means 54B comprise an oscillator 60B, for example of Schmitt trigger type, connected at the input to a capacitor C2B and at the output to the gate of a field effect transistor T1B. Furthermore, the electrical processing means 54B comprise a feedback link CR1B connected between an output of the oscillator 60B and an input of the oscillator 60B.

The electrical processing means 54B also comprise a first processing block 62B, linked to the presence sensor 52B and designed to process the measurement signal emitted by the presence sensor 52B.

The charge device 56B is designed to harvest a part of the electrical energy transmitted over the electrical link 21B, when the lighting module 10B is in its forward bias, that is to say when the forward bias command signal is detected.

The capacitor 58B is designed to store the electrical energy harvested by the charge device 56B and to electrically power, with a reference voltage Vref, the transmission means 25B.

The oscillator 60B is able to control, via an alternating command signal S4, the transistor T1B between its passing state and its blocking state, as a function of the data measured by the temperature 48B and brightness 50B sensors. The oscillator 60B is thus able to vary the current transmitted over the electrical link 21B by the transmission device 20B, that is to say the parameterizing signal S1, when the lighting module 10B is in its reverse bias. The variation of the current lies between a high state corresponding to the passing state of the transistor T1B and a low state corresponding to the blocking state of the transistor T1B. More specifically, the oscillator 60B is suitable for varying the frequency of the alternating command signal S4 and therefore of the parameterizing signal S1, as a function of the value of the electrical resistance of the thermistor 48B. In effect, when the resistance of the thermistor 48B varies, then a first global resistance R1, seen by the oscillator 60B at its input and not represented in the figures, varies. Now, the oscillator 60B is designed to generate the alternating command signal S4 with a frequency that is a function of the first global resistance R1, also called first equivalent resistance.

The feedback link CR1B comprises two branches in parallel to one another, comprising a resistor R3B and a diode D3B biased in one direction and respectively a resistor R4B and a diode D4B biased in another direction. The feedback link CR1B is connected between, on the one hand, the output of the oscillator 60B and, on the other hand, the temperature sensor 48B which is connected to the input of the oscillator 60B.

The brightness sensor 50B is connected in parallel to the resistor R4B and in series with a resistor R5B.

The capacitor C2B is designed to charge when the brightness sensor 50B picks up radiations and generates a current. The capacitor C2B is thus suitable for varying the voltage at the input of the oscillator 60B.

The duty cycle of the alternating command signal S4 varies as a function of the measurement signal emitted by the brightness sensor 50B. In effect, the brightness sensor 50B, and the feedback CR1B, are designed to increase the intensity of the current circulating over the feedback link CR1B to the capacitor CR2B when the brightness sensor 50B detects one or more light radiations. This makes it possible to modify the voltage at the input of the oscillator 60B, and therefore the duty cycle of the alternating command signal S4. The brightness sensor 50B is therefore able to vary the duty cycle of the parameterizing signal S1, and then of the current passing through the first switch 26B and transmitted to the driving member 18B, since it is able to vary the duty cycle of the alternating command signal S4.

The processing block 62B is connected between the transistor T1B and the second conductor 36B, and more specifically between the drain of the transistor T1B and the second conductor 36B. The processing block 62B comprises a controllable switch I7B, driven by the presence sensor 52B. The processing block 62B also comprises a resistor R6B, connected in series with the controllable switch I7B, and a resistor R7B, connected in parallel to the controllable switch I7B and the resistor R6B. The processing block 62B is suitable for varying the amplitude of the parameterizing signal S1, as a function of the measurement signal emitted by the presence sensor 52.

The controllable switch I7B is, for example, mobile between an open position in which a current passes through the resistor R6B and a closed position in which the resistor R6B is electrically isolated from the resistor R7B. The switch I7B is then in closed position when the presence sensor 52B detects a presence, and in open position when no presence is detected.

Depending on the open or closed position of the switch I7B, a second global resistance R2 of the processing block 62B varies. The second resistance R2 is not represented in the figures and is also called second equivalent resistance. When the switch I7B is in open position, the value of the second global resistance R2 is globally equal to that of the resistor R7B, and when the switch I7B is in closed position, the value of the second global resistance R2 is globally equal to that of the resistors R7B and R6B placed in parallel. The current and therefore the parameterizing signal S1 transmitted by the transmission means 25B are thus either proportional to the value of the resistor R7B, or proportional to the value of the resistors R7B and R6B placed in parallel, according to the measurement signal transmitted by the presence sensor 52. The amplitude of the parameterizing signal S1 varies as a function of the measurement signal transmitted by the presence sensor 52B.

The transmission device 20B is therefore designed to vary the value and/or the form of the parameterizing signal S1, that is to say of the current transmitted over the electrical link 21B, when the lighting module 20B is in its reverse bias, as a function of the data measured by the temperature 48B, brightness 50B and presence 52B sensors.

Advantageously, the reading of the voltage transmitted over the electrical link 21B by the voltage measurement member 46B makes it possible to identify, as a function of the amplitude of the parameterizing signal S1, whether the presence sensor 52B has detected a presence or not. In effect, the amplitude of the parameterizing signal S1 depends on the value of the voltage applied to the electrical link 21B.

Figure 3:
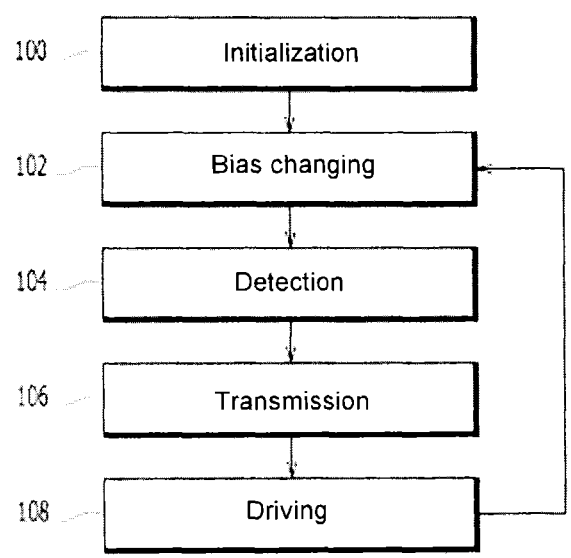
FIG. 3 is a flow diagram of a method for transmitting a parameterizing electrical signal to a member for driving the lighting modules of FIG. 1 according to the first embodiment of the invention.

The operation of the power supply system 12 and of the transmission devices 20A, 20B, 20C will now be described with the aid of the transmission method corresponding to the flow diagram of FIG. 3. Hereinafter in the description, the method will be described only for the second lighting module 10B and for the transmission device 20B, the driving member 18B and the electrical link 21B which are associated with it. This description applies equally to the driving members 18A, 18C, transmission devices 20A, 20C and electrical links 21A, 21C associated with the first 10A, respectively third 10C, lighting modules.

In a first initialization step 100, the driving member 18B recovers the bias of the lighting module 10B and/or an identifier of the lighting module 10B, and/or configuration parameters of the lighting module 10B, corresponding for example to a nominal voltage and/or to a nominal operating current of the lighting module 10B, that is to say to a current and to a voltage corresponding to an optimal operation of the lighting module 10B.

The configuration parameters, the bias and/or the identifier are either transmitted to the driving member 18B by an external communication module, not represented, transmitted via the lighting module 10B and the electrical link 21B, or discovered by the driving member 18B using predetermined algorithms.

After the initialization step 100, the driving member 18B is designed to drive the lighting module 10B and notably to power the lighting module 10B when a user commands it. The driving member 18B then transmits the forward bias command signal S3 to the lighting module 10B. The electrical energy storage member 28B then stores a part of the electrical energy transmitted over the electrical link 21B and intended to power the lighting module 10B.

Then, following the initialization step 100, in a bias changing step 102, the bias changing means 24B generate the reverse bias command signal S2 and change the bias of the lighting module 10B for the maximum duration.

Then, in a detection step 104, the first switch 26B detects the reverse bias command signal S2, since its bias is opposite to that of the lighting module 10B, and switches from its open position to its closed position. Similarly, the second switch 30B detects the reverse bias command signal S2, and switches from its closed position to its open position. The electrical energy storage member 28B is then electrically isolated from the electrical link 21B and electrically powers the transmission device 20B.

Following the detection of the reverse bias command signal S2 by the first 26B and/or second 30B switches, in a transmission step 106, the transmission device 20B recovers the data measured by the temperature 48B, brightness 50B and presence 52B sensors. Then the electrical processing means 54B generate the parameterizing signal S1 and transmit the parameterizing signal S1 to the driving member 18B. The parameterizing signal S1 is modulated in frequency, in amplitude and in duty cycle, as a function respectively of the data measured by the temperature sensor 48B, the presence sensor 52B and the brightness sensor 50B.

Finally, in a driving step 108, following the transmission step 106, the driving member 18B and more specifically the current 44B and voltage 46B measurement members measure the current and the voltage on the electrical link 21B. The control block 42B then controls the electrical power delivered over the electrical link 21B, as a function of the parameterizing signal S1 transmitted and therefore notably as a function of the duty cycle, of the frequency and of the amplitude of the current measured by the current measurement member 44B. The driving member 18B therefore drives the electrical power delivered over the electrical link 21B as a function of the data measured by the different sensors 48B, 50B, 52B.

The bias changing step 102 is then repeated according to the predetermined period, so as to regularly transmit the parameterizing signal S1 to the driving member 20B and therefore so as to regularly transmit the data measured by the sensors 48B, 50B, 52B.

Figure 4:
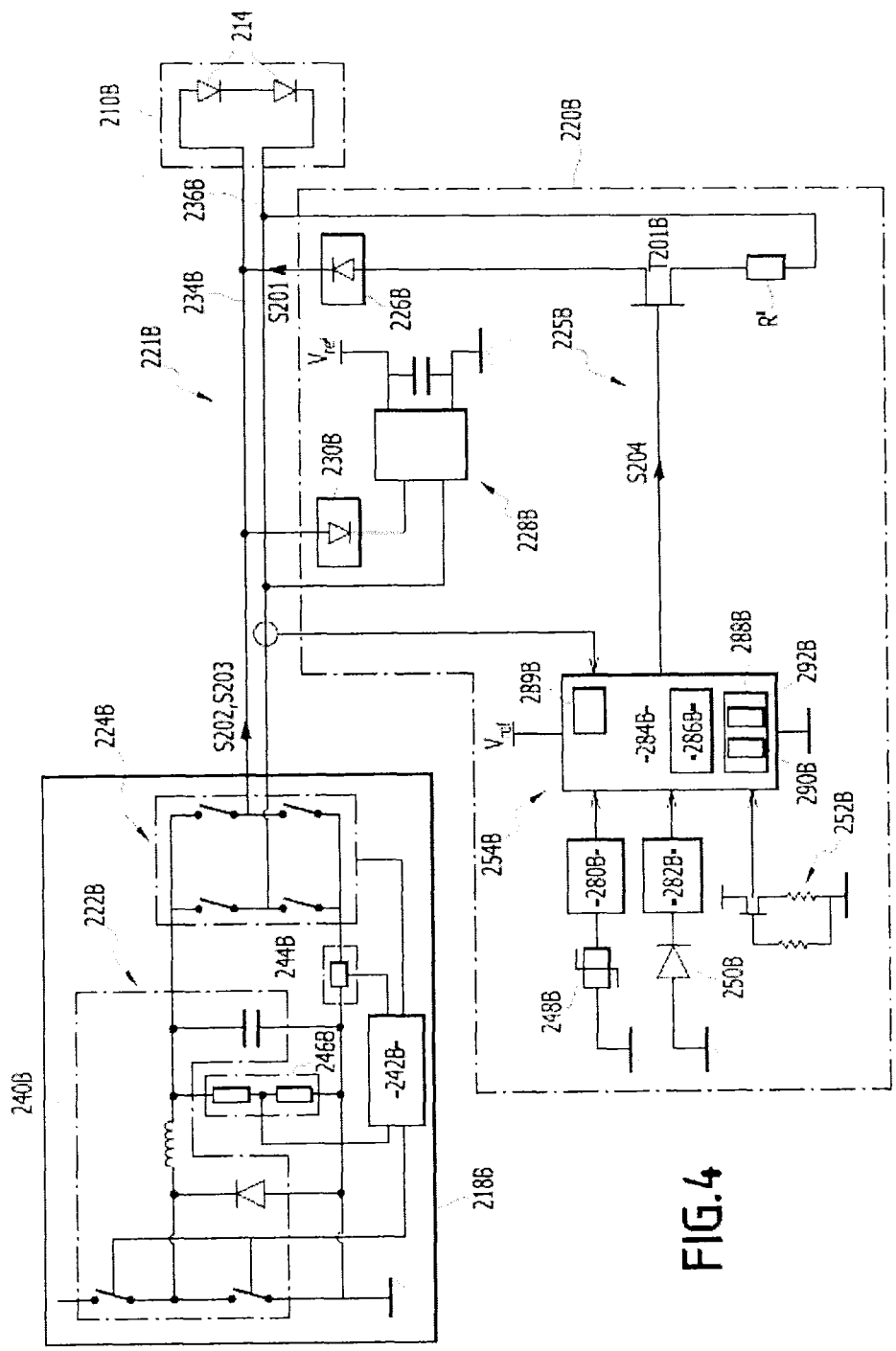
FIG. 4 is a view similar to that of FIG. 2 according to a second embodiment of the invention.

In a second embodiment of the invention, presented in FIG. 4, the elements similar to those of the first embodiment are not described again, and bear the same references increased by 200. Hereinafter in the description, only the differences between the first and second embodiments will be described.

The diagram of FIG. 1 presenting a lighting assembly applies equally to the second embodiment; only the reference numbers are to be modified.

In the second embodiment, the driving member 218B is similar to the driving member presented in the first embodiment. The differences between the first and second embodiments relate to the transmission device.

Thus, in FIG. 4, a transmission device 220B is designed to be linked to the driving member 218B and to the lighting module 210B with which it is associated, via an electrical link 221B between the driving member 218B and the lighting module 210B.

The transmission device 220B comprises means 225B for transmitting a parameterizing signal S201 to the driving member 218B, and a first switch 226B suitable for switching, that is to say varying, between an open position in which the transmission means 225B and the electrical link 221B are electrically isolated from one another, and a closed position, in which the transmission means 225B and the electrical link 221B are electrically linked to one another.

The transmission device 220B also comprises an electrical energy storage member 228B and a second switch 230B suitable for switching between a closed position, in which the energy storage member is electrically linked to the electrical link 221B and stores at least a part of the electrical energy transmitted over the electrical link 221B and an open position, in which the energy storage member 228B is electrically isolated from the electrical link 221B.

The means 225B for transmitting the parameterizing signal to the driving member 218B comprise a temperature sensor 248B, a brightness sensor 250B and a presence sensor 252B associated with electrical means 254B for processing data supplied by the temperature 248B, brightness 250B and presence 252B sensors.

The electrical processing means 254B are connected between, on the one hand, the second conductor 236B and, on the other hand, the first switch 226B which is itself connected to the first conductor 234B. Thus the electrical processing means 254B are connected between the first 234B and second 236B conductors.

The electrical processing means 254B are designed to process measurement data and/or signals emitted by the temperature 248B, brightness 250B and presence 252B sensors, to generate the parameterizing signal S201. The electrical processing means 254B are designed to transmit the parameterizing signal S201 when the first switch 226B is in its closed position and, more specifically, when the reverse bias command signal S202 is detected.

The electrical processing means 254B comprise a first amplifier 280B associated with the temperature sensor 248B, a second amplifier 282B associated with the brightness sensor 250B and a processing unit 284B to which are connected the first 280B and second 282B amplifiers, and the presence sensor 252B.

The electrical processing means 254B also comprise a field effect transistor T201B, the gate of which is connected to an output of the processing unit 284B and the source and the drain of which are connected between the first 234B and second 236B conductors. Furthermore, the electrical processing means 254B comprise a resistor R' connected between the second conductor 236B and the drain of the transistor T201B.

The processing unit 284B is designed to command the transistor T201B into its passing state or into its blocking state via a digital command signal S204 from the transistor T201B. More specifically, the processing unit 284B is suitable for generating the digital command signal S204 for the transistor T201B.

The processing unit 284B comprises a processor 286B, a memory 288B and a block 289B for measuring the current circulating on the electrical link 221B.

The processor 286B is designed to execute software contained in the memory 288B. The memory 288B contains first software 290B for storing an identifier of the lighting module 210B and configuration parameters of the lighting module 210B, and software 292B for generating a digital command signal S204.

The current measurement block 289B is suitable for detecting the reverse bias command signal S202 and the forward bias command signal S203. In effect, when the lighting module 210B is reverse biased, the intensity of the current measured by the measurement block 289B is zero and the reverse bias command signal S202 is detected, whereas, when the lighting module is forward biased, the intensity of the measured current is greater than a predetermined current threshold, and the forward bias command signal S203 is detected. The threshold of the current is, for example, equal to 40 mA.

The generation software 292B is designed to generate the digital command signal S204 as a function of the data measured by the temperature 248B, brightness 250B and presence 252B sensors, that is to say measurement signals and/or data transmitted by the sensors 248B, 250B, 252B to the processing unit 284B. The generation software 292B is also designed to generate the digital command signal S204 as a function of the intensity of the current measured on the electrical link 221B and of the identifier and configuration parameters stored by the storage software 290B.

The generation software 292B is, for example, designed to generate the digital command signal S204 as a function of the current and/or of the voltage transmitted by: the first amplifier 280B, that is to say the temperature sensor 248B, and/or the second amplifier 282B, that is to say the brightness sensor 250B and/or the presence sensor 252B.

The parameterizing signal S201 depends on the digital command signal S204 and is thus a function of at least a datum measured by one of the temperature 248B, brightness 250B and presence 252B sensors or of the identifier or of the configuration parameters.

The generation software 292B is suitable for generating the digital command signal S204 only when the current measurement block 289B detects the reverse bias command signal S202. Thus, the transmission device 220B is suitable for transmitting the parameterizing signal S201 only when the reverse bias command signal S202 is detected.

More specifically, the generation software 292B is designed to generate the digital command signal S204 in the form of a different message for each datum measured by the temperature 248B, brightness 250B and presence 252B sensors or configuration parameter or identifier. Thus, the digital command signal S204 corresponds to a frame, coded in the form of a voltage applied to the transistor T201B, different for each message. Each frame comprises a predetermined total number of bits with, for example, two identification bits, situated in a predetermined position in the frame and corresponding to the type of information transmitted in the message, and a predetermined number of data bits. The value of the identification bits depends on the different types of information transmitted via the parameterizing signal S204 and is different if the information transmitted relates to a datum measured by the temperature sensor 248B or the brightness sensor 250B or the presence sensor 252B or to the identifier or to one of the configuration parameters stored by the storage software 290B.

The generation software 292B is thus designed to generate, each time the reverse bias command signal S202 is detected, the digital command signal S204 in the form of a different message, of which the data and identification bits depend on the type of information to be transmitted to the driving member 218B.

The generation software 292B generates, for example in succession, a first message comprising the identifier of the lighting module 210B, then a second message comprising the brightness measured by the brightness sensor 250B, then a third message comprising a datum measured by the presence sensor 252B, then a fourth message comprising the temperature measured by the temperature sensor 248B.

As a variant, following the powering up of the transmission device 220B, the transmission device 220B transmits, as priority, a fifth message comprising the configuration parameter or parameters.

Advantageously, each frame comprises, for example, one start bit, two identification bits, a predetermined number of data bits, one parity bit making it possible to check the validity of the frame, that is to say of the message transmitted, and one stop bit.

The parameterizing signal S201 is a function of the frame generated by the generation software 292B and has, for example, a form identical to that of the frame generated and therefore notably comprises the identification and data bits. The parameterizing signal S201 corresponds, as in the first embodiment, to a current transmitted to the driving member 218B.

The driving member 218B, and more specifically the control block 242B, are designed to recover the parameterizing signal S201 by virtue of the current measurement member 244B. The control block 242B is suitable for identifying, via the identification bits, the frame to which the parameterizing signal S201 corresponds, that is to say the measured datum or configuration parameter or identifier to which the parameterizing signal S201 corresponds. The control block 242B is able to recover the data bits contained in the parameterizing signal S201, by virtue of the current measurement member 244B, in order to drive the electrical power delivered over the electrical link 221B as a function of the data bits.

Figure 5:
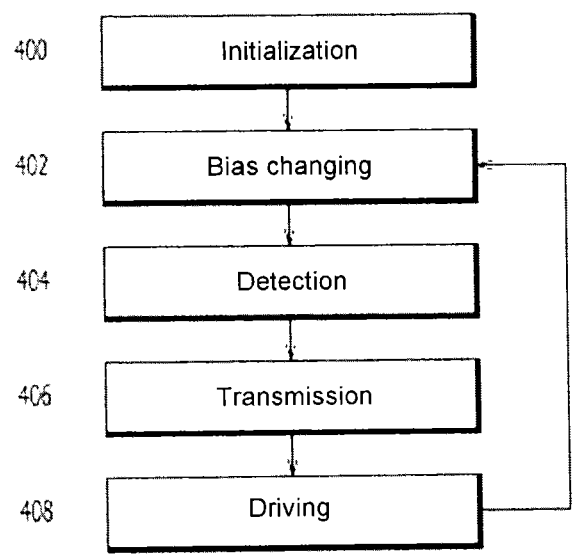
FIG. 5 is a flow diagram similar to that of FIG. 3 according to the second embodiment of the invention.

The operation of the second embodiment will now be presented with the aid of the transmission method corresponding to the flow diagram of FIG. 5.

In a first step 400 of initialization of the lighting module 210B, the driving member 218B recovers and/or discovers the bias of the lighting module 210B.

After the initialization step 400, the driving member 218B is designed to drive the lighting module 210B and notably to power and switch on the lighting module 210B when a user commands it. The driving member 218B then transmits the forward bias command signal S203 to the lighting module 210B. The electrical energy storage member 228B then stores a part of the electrical energy transmitted over the electrical link 221B and intended to power the lighting module 210B.

Then, following the initialization step 400, in a bias changing step 402, the bias changing means generate the reverse bias command signal and change the bias of the lighting module 210B for the maximum duration.

Then, in a detection step 404, the first switch detects the reverse bias command signal since its bias is opposite to that of the lighting module 210B and switches from its open position to its closed position. Similarly, the second switch detects the reverse bias command signal and switches from its closed position to its open position. The electrical energy storage member 228B is then electrically isolated from the electrical link 221B and electrically powers the transmission device 220B. Furthermore, the processing unit 284B detects, by virtue of the current measurement block 289B, the reverse bias command signal.

Following the detection of the reverse bias command signal by the processing unit 284B, in a transmission step 406, the transmission device 220B recovers, for example, the identifier of the lighting module 210B. Then, the transmission means 225B transmit the parameterizing signal S201, which corresponds in the case of the abovementioned example to the transmission of the first message by the processing unit 284B to the transistor T201B.

As a variant, in the transmission step 406, the second, third, fourth or fifth message is transmitted by the processing unit 284B.

Finally, in a driving step 408, following the transmission step 406, the driving member 218B and more specifically the current 244B and voltage 246B measurement members measure the current and the voltage on the electrical link 221B. The control block 242B then controls the electrical power delivered over the electrical link 221B as a function of the parameterizing signal S201 transmitted and therefore notably as a function of the value of the current measured on the electrical link 221B.

The bias changing step 402 is then repeated according to the predetermined period, and, in the transmission steps 406, the parameterizing signal S201 varies and corresponds to the successive transmission of the second, third, fourth and fifth messages by the processing unit 284B.

Figure 6:
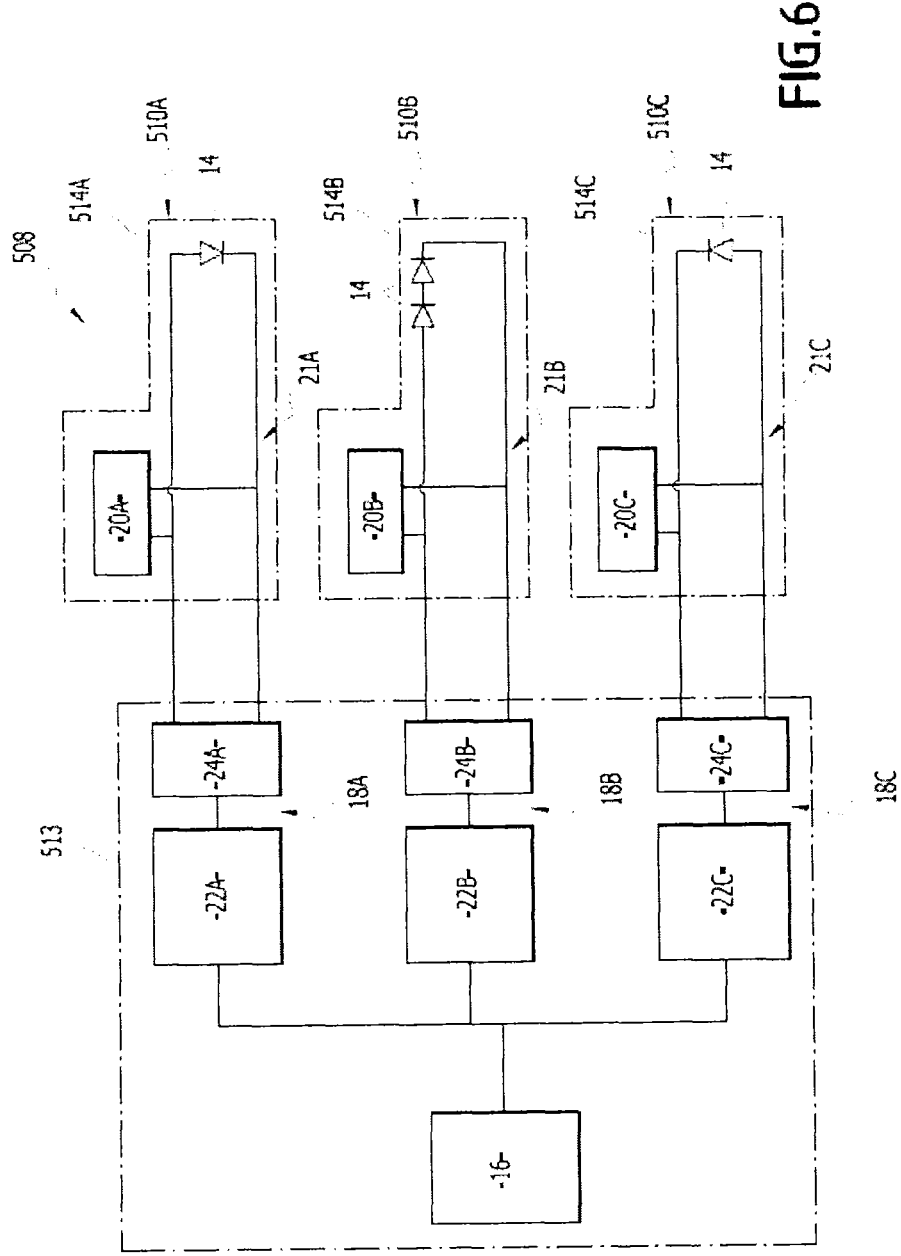
FIG. 6 is a representation similar to that of FIG. 1, according to a third embodiment of the invention.

In a third embodiment of the invention, presented in FIG. 6, the elements similar to those of the first embodiment are not described again and bear the same references. Hereinbelow, only the differences between the first and third embodiments will be described.

In FIG. 6, a lighting assembly 508 with light-emitting diodes is represented. The assembly 508 comprises a first 510A, a second 510B and a third 510C lighting modules with light-emitting diodes, and an electrical power supply block 513 for the lighting modules 510A, 510B, 510C.

Unlike the first embodiment, each lighting module 510A, 510B, 510C comprises a protection casing 514A, 514B, 514C inside which are arranged the light-emitting diode or diodes 14 and a device 20A, 20B, 20C for transmitting a parameterizing electrical signal S1 to a driving member 18A, 18B, 18C for the lighting module 510A, 510B, 510C.

In other words, each lighting module 510A, 510B, 510C incorporates a corresponding transmission device 20A, 20B, 20C.

The power supply block 513 comprises a power supply member 16 and the driving members 18A, 18B, 18C.

The power supply block 513 is suitable for being electrically linked to the lighting modules 510A, 510B, 510C, that is to say to the transmission devices 20A, 20B, 20C and to the diodes 14 included in the lighting modules 510A, 510B, 510C.

The operation of the lighting assembly 508 is similar to that of the lighting assembly 8 described in FIG. 1.

Furthermore, in the third embodiment, the transmission devices 20A, 20B, 20C are similar to the transmission devices described in the first embodiment of the invention. As a variant, in the third embodiment, the transmission devices are similar to the transmission device 220B described in the second embodiment of the invention.

As a variant, in the different embodiments, one and the same driving member 18A, 18B, 18C, 218B is associated with a number of lighting modules 10A, 10B, 10C, 210B.

According to another variant, not represented, in the first and second embodiments, each transmission device 20A, 20B, 20C, 220B is suitable for being incorporated in an electrical connector which is designed to be electrically linked to the corresponding lighting module 10A, 10B, 10C, 220C.

According to another variant, one and the same transmission device 20A, 20B, 20C, 220B is associated with a number of lighting modules 10A, 10B, 10C, 210B.

By virtue of the invention, each transmission device 20A, 20B, 20C, 220B is suitable for transmitting, to the corresponding driving member 18A, 18B, 18C, 218B, data measured by the sensors 48B, 50B, 52B, 248B, 250B, 252B and/or the identifier of the lighting module 10A, 10B, 10C, 210B and/or configuration parameters without using a dedicated electrical link. In effect, the parameterizing signal S1, S201 is transmitted via the electrical link 21A, 21B, 21C, 221B, via which the driving member electrically powers the corresponding lighting module 10A, 10B, 10C, 210B. Thus, the architecture of the electrical links between the driving member 18B and the transmission device 20B is simplified.

Furthermore, the transmission of the parameterizing signal S1, S201 to the driving member 18B, 218B is simplified and improved since the parameterizing signal S1, S201 is transmitted when the changing means 24B, 224B command the lighting module 20B, 210B to switch to reverse bias, that is to say to its reverse bias.

The power supply system 12 is therefore simpler to implement and, when installing such a system in a building, the setting up of the connection between the different elements of the power supply system 12 and the lighting module or modules is simplified.

Moreover, such a power supply system makes it possible for the driving member 18A, 18B, 18C, 218B to recover a lot of information concerning the lighting module or modules 10A, 10B, 10C, 210B with which it is associated and concerning the environment in which the lighting modules 10A, 10B, 10C, 210B are situated. The control of the lighting module, notably according to the environmental conditions in which it is located, is thus optimized.

Furthermore, in the second embodiment, the driving member 218B is able to recover the identifier of the lighting module 210B that it drives and, advantageously, the configuration parameters of the lighting module 210B, and thus identify the lighting module and its characteristics to drive it optimally.

The maximum time for the lighting module to switch to reverse bias is fairly short to allow the transmission of the parameterizing signal S1, S201 without an operator perceiving any variation of the brightness of the lighting module 10B, 210B.

The embodiments and variants envisaged above are suitable for being combined with one another in all technically admissible combinations.

The invevtion claimed is:

1. An apparatus for transmitting a parameterizing electrical signal to a driving member of a lighting module with light-emitting diodes, the lighting module comprising at least one light-emitting diode and the lighting module being configured to be biased according to a forward bias or a reverse bias, the light-emitting diode or diodes being forward biased for the forward bias of the lighting module, and respectively reverse biased for the reverse bias of the lighting module, the apparatus comprising:
    a transmission device for transmitting the parameterizing electrical signal to the driving member, and
    the driving member comprising a changing device for changing the bias of the lighting module,
    wherein the transmission device is configured to be connected to a wired electrical link between the driving member and the lighting module,
    wherein the transmission device comprises a first detection device for detecting a reverse bias command signal commanding the lighting module to switch to reverse bias, the reverse bias command signal being generated by the changing device, and
    wherein the transmission device is adapted to transmit the parameterizing signal to the driving member, following the detection of the reverse bias command signal.

2. The apparatus according to claim 1,
    wherein the first detection device comprises a first member for measuring a current intensity on the wired electrical link, the first detection device being configured to detect the reverse bias command signal when the current intensity is zero.

3. The apparatus according to claim 1, wherein the first detection device comprises a first switch configured to switch between an open position, in which the transmission device and the wired electrical link are electrically isolated from one another, and a closed position, in which the transmission device and the wired electrical link are electrically linked to one another, the first switch being configured to switch to the closed position following the detection of the reverse bias command signal.

4. The apparatus according to claim 3, wherein the transmission device comprises a second detection device for detecting a forward bias command signal commanding the lighting module to switch to forward bias, the forward bias command signal being generated by the changing device, wherein
the first switch is configured to switch to the open position following the detection of the forward bias command signal.

5. The apparatus according to claim 4, further comprising an energy storage member and
a second switch configured to switch between a closed position, in which the energy storage member is electrically linked to the wired electrical link and stores at least a part of the electrical energy transmitted over the wired electrical link and an open position, in which the energy storage member is electrically isolated from the wired electrical link,
the second switch being configured to switch to the open position following the detection of the reverse bias command signal and to the closed position following the detection of the forward bias command signal.

6. The apparatus according to claim 1, further comprising
a recovery device for recovering parameters associated with the lighting module or with an environment in which the lighting module is installed and
a modification device for modifying the amplitude or the form of the parameterizing signal transmitted over the wired electrical link as a function of the parameters recovered by the recovery device.

7. The apparatus according to claim 3, wherein the transmission device is configured to transmit a current over the wired electrical link when the first switch is in the closed position, the transmitted current corresponding to the parameterizing signal.

8. A power supply system for one or more lighting modules with light-emitting diodes, each lighting module comprising at least one light-emitting diode and being configured to be biased according to a forward bias or a reverse bias, the light-emitting diode or diodes being forward biased for the forward bias of the respective lighting module and respectively reverse biased for the reverse bias of the respective lighting module, the system comprising:
an electrical power supply member for the lighting module or modules, the electrical power supply member being electrically linked to each driving member, and
at least one apparatus according to claim 1 for transmitting the parameterizing electrical signal to the driving member.

9. The power supply system according to claim 8, wherein the driving member is linked to a corresponding lighting module via a wired electrical link and wherein the electrical link is adapted to transmit, at a time, a reverse bias command signal, a forward bias command signal and the parameterizing signal and comprising only a first conductor and a second conductor.

10. The power supply system according to claim 9, wherein the driving member is adapted to deliver an electrical power to the corresponding lighting module via the electrical link, as a function of the amplitude or of the form of the parameterizing signal.

11. The power supply system according to claim 8, wherein each apparatus comprises a first switch in the form of a diode biased opposite to that of a corresponding lighting module.

12. The power supply system according to claim 8, wherein the changing device is adapted to command the lighting module or modules to reverse bias for a predetermined maximum duration of a value less than 100 ms.

13. A lighting module with light-emitting diodes comprising:
at least one light-emitting diode and
a protection casing inside which are arranged the light-emitting diode or diodes,
the lighting module being configured to be biased according to a forward bias or a reverse bias and the light-emitting diode or diodes being forward biased for the forward bias of the lighting module and respectively reverse biased for the reverse bias of the lighting module,
said lighting module comprising an apparatus according to claim 1 arranged inside the protection casing.

14. A lighting assembly with light-emitting diodes comprising:
one or more lighting modules with light-emitting diodes, each lighting module comprising at least one light-emitting diode and being configured to be biased according to a forward bias or a reverse bias and the light-emitting diode or diodes being forward biased for the forward bias of the lighting module and respectively reverse biased for the reverse bias of the lighting module,
at least one driving member of the lighting module or modules, the driving member comprising means for changing the bias of the lighting module or modules,
an electrical power supply member for the lighting module or modules, the power supply member being electrically linked to each driving member, and
at least one apparatus according to claim 1 for transmitting a parameterizing electrical signal to the driving member or members.

15. A method for transmitting a parameterizing electrical signal to a driving member of a lighting module with light-emitting diodes,
the lighting module comprising at least one light-emitting diode and being configured to be biased according to a forward bias or a reverse bias, the light-emitting diode or diodes being forward biased for the forward bias of the lighting module, and respectively reverse biased for the reverse bias of the lighting module,
the driving member comprising a changing device for changing the bias of the lighting module,
the method comprising:
generating a reverse bias command signal commanding the lighting module to switch to reverse bias,
detecting the reverse bias command signal, and
transmitting the parameterizing electrical signal to the driving member, wherein the transmitting is performed following the detecting the reverse bias command signal.

* * * * *